Dec. 2, 1952     G. F. WALES ET AL     2,619,846
CONTROL DEVICE
Filed June 24, 1949     2 SHEETS—SHEET 2
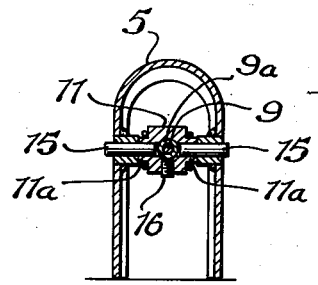
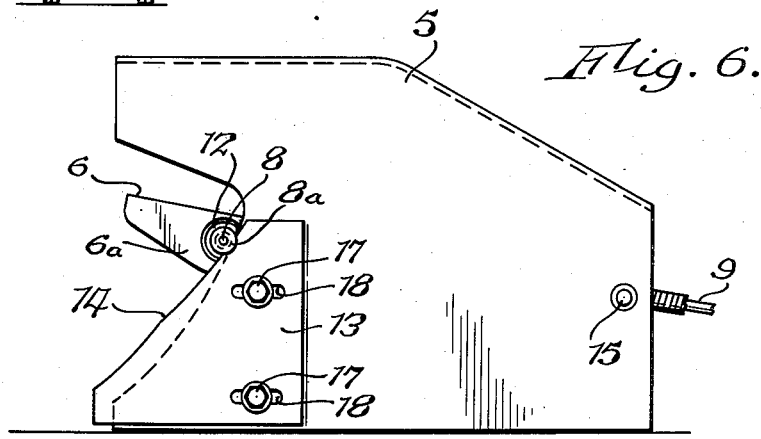
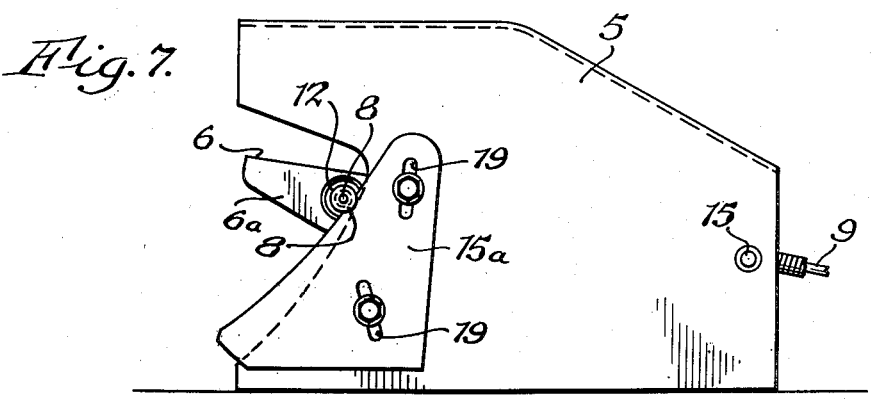
INVENTORS
George F. Wales
Paul H. Taylor
By. Edwin B. Gary
Attorney Patented Dec. 2, 1952

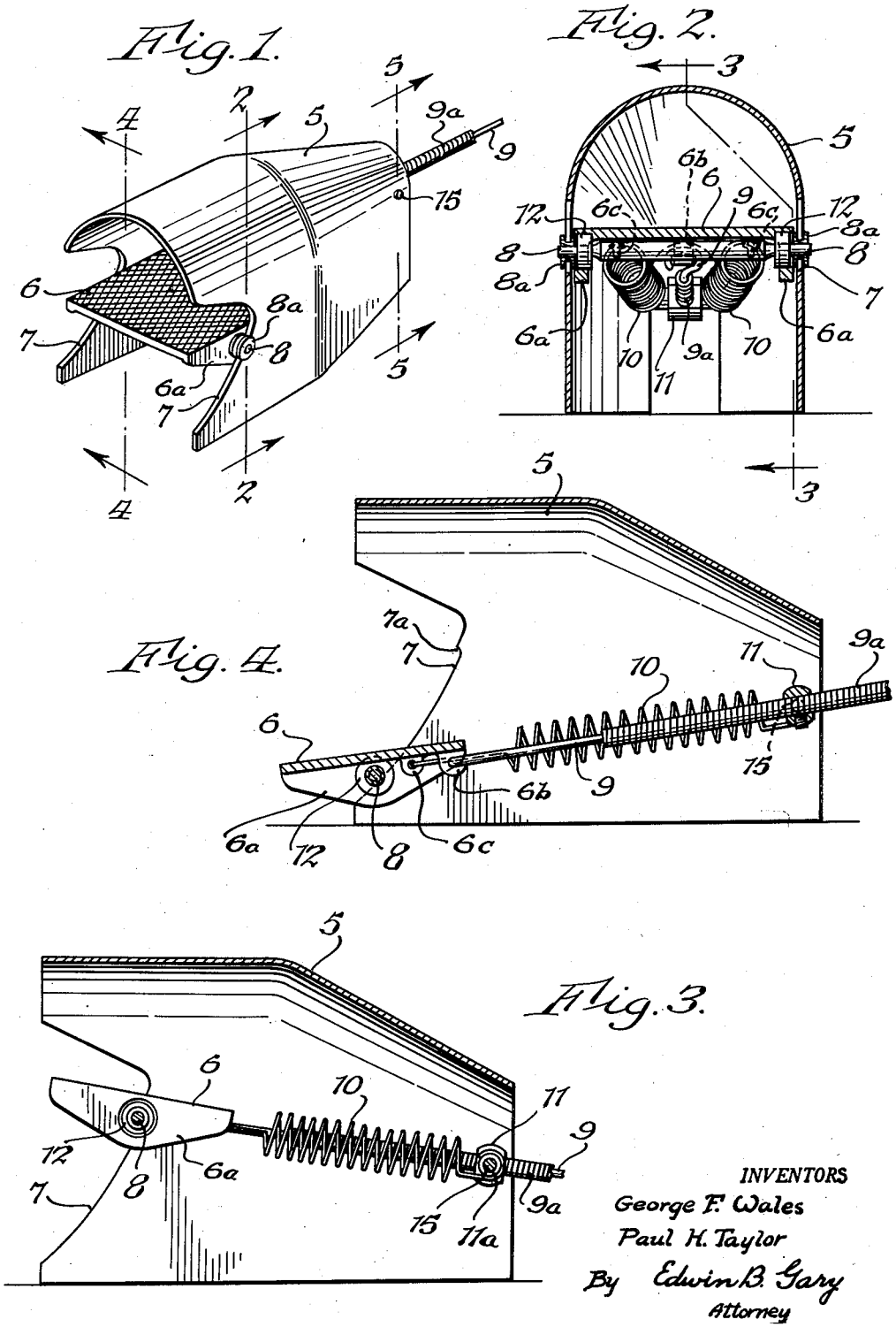

2,619,846

UNITED STATES PATENT OFFICE 2,619,846

CONTROL DEVICE

George F. Wales, Kenmore, and Paul H. Taylor, North Tonawanda, N. Y.; said Taylor assignor to said Wales Application June 24, 1949, Serial No. 101,218

4 Claims. (Cl. 74—512)

This invention relates to a control device which, although not limited to such use, possesses features which render it of particular utility in connection with the remote control of machine tools.

Machine tools, which are mechanically controlled by an operator, vary widely with respect to the character of the effort (manual or pedal as the case may be) required to be exerted in the control strokes by which operation of such tools is initiated or regulated. Such effort may vary not only in degree with respect to different machines, but, unless provision is made to prevent this, may also, and usually does, vary with respect to individual machines. For example, in some machines, the highest load to be overcome by the control stroke is encountered during the initial part of such stroke. In other machines it is encountered during mid portion of the control stroke, while in still other machines the highest load is encountered during the final part of the control stroke. As most machines which are mechanically controlled are so designed that substantial effort on the part of the operator is called for to initiate, or control, the operation of the machine; and as it is desirable, although it has not always been possible, to design the control device for such machines so that the effort requirements will be maintained substantially constant throughout the control strokes, it has been the practice in each instance to design a special control device which will provide the desired mechanical advantage for the special conditions characteristic of the particular machine tool. This procedure has resulted in considerable duplication of effort on the part of various machine tool manufacturers; and as the control devices so provided have in effect been custom made, it has increased substantially the cost of such machines.

The principal object of the present invention, therefore, is to overcome the above objections, this object contemplating a control device which is, within limits, capable of universal application, being so designed that the desired mechanical advantage which is fixed by the particular machine with which the device is to be employed, will be provided.

A further object is to provide a control device characterized by features which adapt it particularly for use in connection with the control of machines by flexible cables, thereby enabling positioning of the control device in a location which will be most convenient to the particular operator.

A still further object is to provide a device of the character generally described which may be readily operated by the foot of the operator, provision being made so that accidental or unintentional operation of the device will be prevented.

Yet another object is to provide a control device which is so designed that it may be operated with ease and facility, its use by the operator of the machine with which it is associated being accompanied by a minimum of fatigue on the part of the operator.

A still further object is a novel design and arrangement of the parts of the control device, whereby to provide for facility in the adjustment of such parts, obtain simplicity and economy in construction, and insure dependability in operation.

The invention is illustrated in the accompanying drawings, wherein:

Figure 1 is a perspective view of a control device embodying the features of the invention.

Figure 2 is an enlarged transverse section taken along line 2—2 of Figure 1.

Figure 3 is a longitudinal section taken along line 3—3 of Figure 2, showing the foot pedal in its uppermost, inoperative position.

Figure 4 is a similar section taken along line 4—4 of Figure 1, showing the pedal in its depressed, operative position.

Figure 5 is a detail, transverse section taken along line 5—5 of Figure 1.

Figure 6 is a side elevational view of a modified form of the device.

Figure 7 is a similar view of another embodiment.

The features of the invention, although not necessarily so limited, lend themselves particularly to control devices of the foot pedal type and are, therefore, illustrated by way of example in connection with such a device.

The control device, as illustrated in Figure 1, includes an arched housing 5 open at either end and at the bottom and having side walls which are adapted to rest upon a suitable supporting surface. If desired, the housing may be closed at the bottom by a base plate upon which the side walls may rest. The housing may, as shown, be enlarged and of a uniform cross-section at one end and taper for a portion of its length in the direction of the opposite end.

The enlarged open end of the housing 5 provides an enclosure for a foot pedal 6, the arched top of the housing overlying the foot pedal in such a manner that its accidental or unintentional operation by falling objects, or otherwise, is prevented. Side flanges 6a on the foot pedal carry bearings 12 in which are mounted the reduced end portions of a shaft 8. The ends of the latter carry grooved wheels, or rollers, 8a which ride upon cam tracks 7 provided by inclined edges of the side walls of the housing 5. The upper ends of the cam tracks 7 terminate in shallow depressions 7a in which the wheels 8a rest when the foot pedal is located at the upper limit of its range of movement, in which position space is provided between the top of the foot pedal and the under side of the arched top of the housing 5 to enable an operator to insert the toe of his shoe far enough to bring the ball portion of his foot over and upon the foot pedal. On its under side and at the forward edge and midway between the side flanges 6a, the foot pedal carries a depending boss 6b. The latter is connected by the control wire 9 of a flexible cable assembly to the control element of the machine tool (not shown) with which the device is associated, the end of the wire 9 which is connected to the control device having, as best shown in Figure 2, a hooked end which passes through a suitable hole in the boss 6b. The flexible cable assembly also includes a cable housing 9a which passes through a block 11 (Figure 5) which is mounted by axle pins 15 between the side walls of the housing at the reduced end. A set screw 16, which is carried by the block 11, is engageable with the cable housing 9a to secure the latter against axial movement with respect to the block 11, the pins 15 being adapted to permit rocking movement of the end of the block 11 and that portion of the cable assembly carried thereby.

The foot pedal 6 is normally held at the upper limit of its range of movement with the wheels, or rollers, 8a resting in the depressions 7a by springs 10. The latter are arranged at opposite sides of the terminal portion of the flexible cable assembly and are connected at one end to hubs 11a on the block 11 and at the opposite end to depending lugs 6c on the underside of the foot pedal 6. The springs 10 are under a predetermined tension and they normally hold the foot pedal at the upper limit of its range of movement, this position being illustrated in Figures 1 and 3.

Control of the machine with which the device is associated is effected by depressing the foot pedal 6. As the latter is moved downwardly and the wheels 8a ride along the cam tracks 7, the control wire 9 is moved lengthwise to initiate or control the operation of the associated machine, the block 11 rocking to permit the terminal portion of the cable assembly to swing downwardly. Lengthwise movement of the control wire 9 is, of course, against the combined resistances of the mechanism which is actuated and the springs 10. Upon release of the foot pedal, the latter is restored to its normal, inoperative upper position.

It will be apparent from the foregoing that the mechanical advantage which is attained by the control device is dependent primarily upon the contour of the cam tracks 7 and that such contour may, therefore, be predetermined so that the mechanical advantage which is obtained may vary throughout the control stroke of the foot pedal 6 in accordance with the resistance offered by the mechanism to be controlled. Thereby the effort called for on the part of the operator may be maintained constant without regard to the characteristics of the particular machine with which the device is associated. Thus merely by varying the contour of the cam tracks 7, the control device may be employed to equal advantage in connection with machines in which the highest load is encountered during the initial part of the control stroke as well as with machines in which the highest load is encountered either during the mid or final portions of the control stroke.

The control device may be so designed that when the operator has one foot resting on the foot pedal, the latter will support the weight of the foot and the weight, or a substantial part of the weight, of the leg. This has the advantage that fatigue of the operator will be minimized. In this connection it will be noted that the foot pedal is mounted so that it may rock, within limits permitted by the flanged wheels 8a, upon the shaft 8, although such rocking movements are resisted to some extent by the springs 10. The slight rocking movements of the foot pedal 6 facilitate entry of the foot of the operator into the housing 5 and also insures angular adjustment of the foot pedal so that a substantial surface thereof will be presented to the foot of the operator.

In the embodiment shown in Figure 6, cam tracks 14 for the wheels, or rollers, 8a of the foot pedal are provided by plates 13. The latter are carried by the side walls of the housing and are adjustably secured thereto by bolts 17 which pass through elongated slots 18 in the plates. The slots 18 permit fore and aft movement of the plates 13, when the bolts 17 are loosened, and in so doing provide for adjustment in the same direction of the cam tracks carried by the plates. In this embodiment, therefore, the cam plates 13 provide cam tracks of different contour from those provided by the housing, which cam tracks are also capable of adjustment.

Cam plates 15a, also adjustable, are shown in Figure 7. The cam plates in this embodiment, as in the case of Figure 6, are also availed of to provide adjustable cam tracks for the wheels 8a of the foot pedal. In this instance also the cam plates are bolted to the side walls of the housing 5 so that they may be adjusted. To provide for this adjustment, the cam plates are formed with openings as indicated at 19, these openings enabling adjustment of the plates 15 in a more or less vertical direction.

It is to be understood that the contour of the cam tracks provided by the plates 13 and 15a may vary and that various methods of attaching the plates to the housing may be availed of, depending upon the particular ranges of adjustments desired. The two methods illustrated for attaching the plates 13 and 15a to the housing are intended for purposes of illustration only.

The control device described has the advantage that it may be employed in connection with various types of machines and its use is not limited or barred in any particular instance because of the particular manner in which control of the machine is to be mechanically effected.

It has been noted that the control device has the advantage that it may be so designed that the effort required throughout a control stroke may be maintained constant regardless of the characteristics of the particular machine with which the device is associated. This feature has been emphasized as this has ordinarily been found to be desired in the control of the operation of standard machines. It is to be understood, however, that those features of the control device which make it possible to attain this objective also have the advantage that the device may be adjusted so that the effort required to control the operation of the associated machine may be varied in the course of a control stroke if this should be, in any particular case, desirable.

The features of the invention have been illustrated by specific structures and by references to specific uses. It is to be understood however, that this is by way of illustration only and that the advantages of the invention may be obtained in connection with other structures and other uses coming within the purview of the appended claims.

We claim as our invention:

1. A control device of the character described including a housing having spaced-apart side walls, cam tracks carried by said side walls, a foot pedal located in said housing between said side walls and adapted to be connected to a machine to be controlled, roller means on said foot pedal which engage and which are movable along said tracks between predetermined limits, and resilient means connected to said foot pedal to hold it on said support and bias it normally at one limit of its range of movement but being yieldable to permit movement of said pedal to the other of said limits.

2. A control device for a machine which is adapted to be mechanically controlled by a flexible cable, said device including a support, a cam track carried by said support, a control element to which said cable is connected, said control element engaging said track, being movable thereon between predetermined limits, and being adapted to be connected to said machine by said cable, and a rockable guide carried by said support and through which said cable is movable lengthwise, the contour of said cam track being predetermined so that said control element and cam track provide a mechanical advantage which varies as said control element moves between said limits.

3. A device for controlling the operation of a machine by a flexible cable of the kind having a sheath and a wire movable therein, said device including a housing having side walls, a member extending transversely between said walls to which a terminal portion of said sheath is connected, a cam track carried by said side walls, a foot pedal to which a terminal of said wire is connected and which is movable along said track between predetermined limits to move said wire in the direction of its length, the contour of said track being predetermined so that said track and foot pedal provide a mechanical advantage which varies in a predetermined manner as said pedal moves between said limits, and resilient means for normally holding said foot pedal at one limit of its range of movement.

4. A device for controlling the operation of a machine by a flexible cable of the kind having a sheath and a wire movable therein, said device including a housing having side walls, a pivotally-mounted member extending transversely between said walls to which a terminal portion of said sheath is connected, a cam track carried by said side walls, a foot pedal to which a terminal of said wire is connected and which is movable along said track between predetermined limits to move said wire in the direction of its length, the contour of said track being predetermined so that said track and foot pedal provide a mechanical advantage which varies in a predetermined manner as said pedal moves between said limits, and resilient means for normally holding said foot pedal at one limit of its range of movement.

GEORGE F. WALES.
PAUL H. TAYLOR.

REFERENCES CITED

The following references are of record in the file of this patent:

UNITED STATES PATENTS

| Number | Name | Date |
|---|---|---|
| 153,857 | Snellbaker | Aug. 4, 1874 |
| 1,247,996 | Parker | Nov. 27, 1917 |
| 1,525,052 | Spotz | Feb. 3, 1925 |
| 1,911,223 | D'Aleo | May 30, 1933 |

FOREIGN PATENTS

| Number | Country | Date |
|---|---|---|
| 186,124 | Switzerland | Aug. 31, 1936 |
| 222,668 | Switzerland | Oct. 16, 1942 |